United States Patent [19]

Raymond

[11] Patent Number: 4,991,966
[45] Date of Patent: Feb. 12, 1991

[54] OPTICAL POSITIONING METHOD AND SYSTEM

[75] Inventor: Gary J. Raymond, Meriden, Conn.

[73] Assignee: United Technologies Corporation, Hartford, Conn.

[21] Appl. No.: 370,674

[22] Filed: Jun. 23, 1989

[51] Int. Cl.$^5$ .............................................. G01B 11/14
[52] U.S. Cl. ........................................ 356/375; 356/1
[58] Field of Search .................... 356/1, 4, 373, 375; 250/561

[56] References Cited

U.S. PATENT DOCUMENTS

| | | | |
|---|---|---|---|
| 3,904,280 | 9/1975 | Tate, Jr. ................................... | 356/1 |
| 4,627,183 | 12/1986 | Stuckman ............................. | 42/1.01 |
| 4,777,754 | 10/1988 | Reynolds, Jr. ....................... | 42/103 |
| 4,888,490 | 12/1989 | Bass et al. ............................. | 356/1 |

FOREIGN PATENT DOCUMENTS

| | | | |
|---|---|---|---|
| 61905 | 4/1982 | Japan .................................. | 356/375 |
| 824107 | 4/1981 | U.S.S.R. ............................. | 356/375 |

Primary Examiner—F. L. Evans
Attorney, Agent, or Firm—Troxell K. Snyder; Marshall E. Rosenberg

[57] ABSTRACT

An optical positioning method and system (1) indicates achievement of a desired distance between a sprayhead (2) and a workpiece (4). The desired distance is indicated when a primary light pattern (16) converges with a secondary light pattern (20) directed from other than a coaxial orientation. A procedure for programming a workpiece's contours is described, which also allows for visual verification of the program.

10 Claims, 4 Drawing Sheets

OPTICAL POSITIONING METHOD AND SYSTEM

FIELD OF THE INVENTION

This invention relates to an optical positioning referencing system and method.

BACKGROUND OF THE INVENTION

Sprayable coatings are extensively used in many industries. Coatings may be metallic or non-metallic, organic or inorganic, and are available in powder, solution, suspension, or colloidal form for application by plasma, electrically or non-electrically-charged spraying systems.

Sprayable coatings are applied to a workpiece for a multitude of purposes. Among the more prevalent purposes are the establishment of thermal, chemical or wear protection barriers, to meet section thickness requirements necessary for structural strength or rigidity, for improvements in flow patterns around or through the coated workpiece, or to enhance or to block electrical conductivity.

Sprayable coatings may be applied to a workpiece with the aid of process control. Process control, which may be provided by CNC instrumentation, simultaneously controls a number of operating parameters. An important operating parameter is flowrate of the spray-coating material through the spray unit. Another important operating parameter is control of the host carrier, i.e. the hardware to which the spray unit is attached. In general, the host carrier must provide several degrees of freedom of motion necessary for precise positioning of the spray unit (and its ancillary equipment) in relation to a workpiece.

A significant problem associated with the deposition of sprayable coatings is the determination and control of the optimum sprayhead distance from the workpiece. Precise control of this parameter is critical for the achievement of the required coating. A workpiece with simple or planar surfaces is easily measurable for sprayhead positioning using relatively simple mechanical measurement techniques. However, as workpiece surfaces become more complex in shape, measurement of distance by these techniques becomes difficult or even impossible. These more complex target surfaces range from intricate curves and bends to inner diameters and complex internal structural members and recesses.

Another problem is determining the optimum sprayhead path in relation to the workpiece. Control of the sprayhead's path as it traverses the workpiece is critical for achievement of proper coating thicknesses. Ideally, proper spraycoating thicknesses can be accomplished by controlling the sprayhead's motion as it traverses the workpiece on a per unit time basis or by control of the sprayhead's peripheral overspray pattern. This is especially important in the creation of tapered coatings which range from full-depth to a flash.

The current art attempts to determine proper spray coating depths and coverage through the use of cumbersome mechanical standards. Depths are manually gauged with mechanical probes, from which the distances from the sprayhead to the target surfaces are manually calculated. These data are then inputted to a numerical controller.

Several serious problems exist with this approach. First, mechanical probes cannot always reach the deepest or most convoluted recesses of a highly engineered workpiece. Inability to properly calculate the depth of a given recess results in improper spray coverage and coating thickness. Second, the related art does not provide for calculation of the sprayhead's angle of spray delivery when the sprayhead traverses a non-planar section of the workpiece. This results in variable coating thicknesses and uncontrolled overspray.

Third, the current art does not provide the operator with the means to visually confirm the new program for a given workpiece. Fourth, the current art's method of programming is not only imprecise, but is very time-consuming to establish. Current practice requires extensive set-up time of the initial workpiece, which reduces the availability of production equipment for other revenue-generating purposes.

Fifth, several reworking operations are considered the norm in correcting the inevitable defects which occur due to inaccuracies in the current art. These defects include over- and underspraying of the workpiece, with related improper coating thicknesses. Expenses related to these reworking operations, such as scrapped material, related additional labor, and increased scheduling demands of production equipment, are necessarily related to higher production costs, and ultimately, to higher costs to the consumer.

SUMMARY OF THE INVENTION

It is a general object of the present invention to provide a method and a system for the positioning of a sprayhead.

It is yet another object of this invention to provide a method and a system for the determination of distance and spray coverage by means other than mechanical contact.

These and other objects will become apparent in the further course of this disclosure.

The present invention provides a method and system for determining the optimum distance necessary for the establishment of a precise and accurate spray pattern, as well as providing for subsequent verification of those predetermined distances and spray patterns. The system utilizes a primary light pattern in combination with a secondary light pattern directed from other than a coaxial orientation to provide a visual indication of sprayhead-workpiece distance. In a typical application, convergence of a shadow cast by the secondary light pattern with the primary light pattern is determinative of the optimum distance necessary for precise and accurate spray coverage.

This invention provides a number of significant advantages over the related art. The depths of inaccessible recesses are easily determined, aiding in the accomplishment of precise and accurate spray coverage. Visual verification of the spraycoating procedure, as programmed, can be performed quickly and precisely by running the host carrier with the positioning system affixed to it, thus replicating the exact motions of the spray unit, and ensuring the accuracy of the program. Also, the positioning system is easily removable and transportable. Finally, significant cost savings are realized due to both quicker and more accurate first-piece set-up as well as the considerable reduction in the amount of reworking operations previously required.

DETAILED DISCLOSURE

Figure 1:
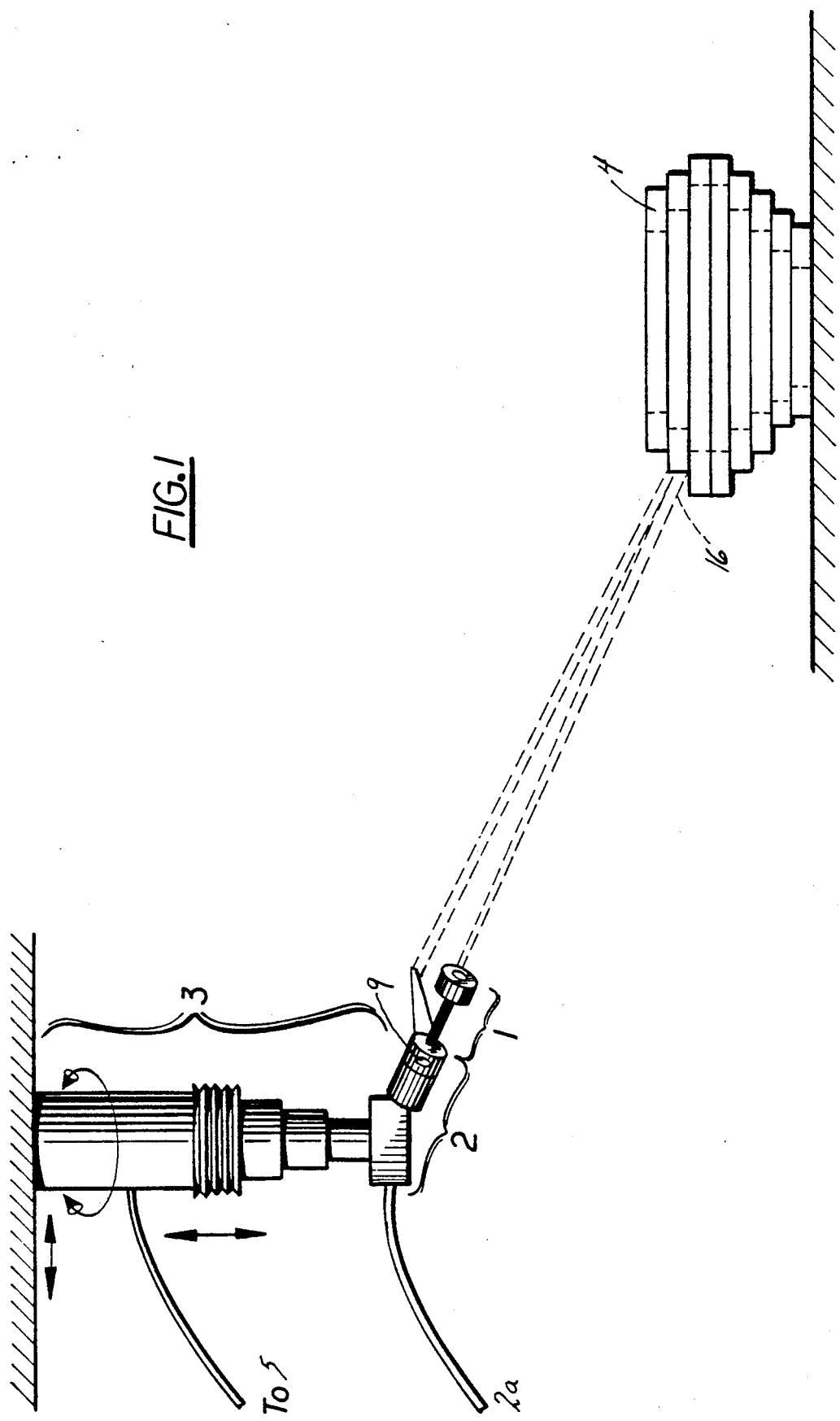
FIG. 1 is a general view of a sprayhead positioning system according to the present invention with a locating arm and a workpiece.

FIG. 1 diagrammatically represents a sprayhead positioning system 1 removably affixed, with a setscrew 9 or the like, to a sprayhead 2 such that the system's primary light pattern 16 upon a workpiece 4 mimics the sprayhead's spray pattern upon the workpiece 4 after the sprayhead positioning system 1 has been detached from the sprayhead 2. The spray unit 2, to which the sprayhead positioning system 1 is attached, is affixed to a locating arm 3. The locating arm 3 provides the sprayhead 2 with a plurality of degrees of freedom of motion necessary for its precise positioning in spaced relationship with the workpiece 4 Position control of the locating arm 3 is provided by a numerical controller 5.

Figure 2:
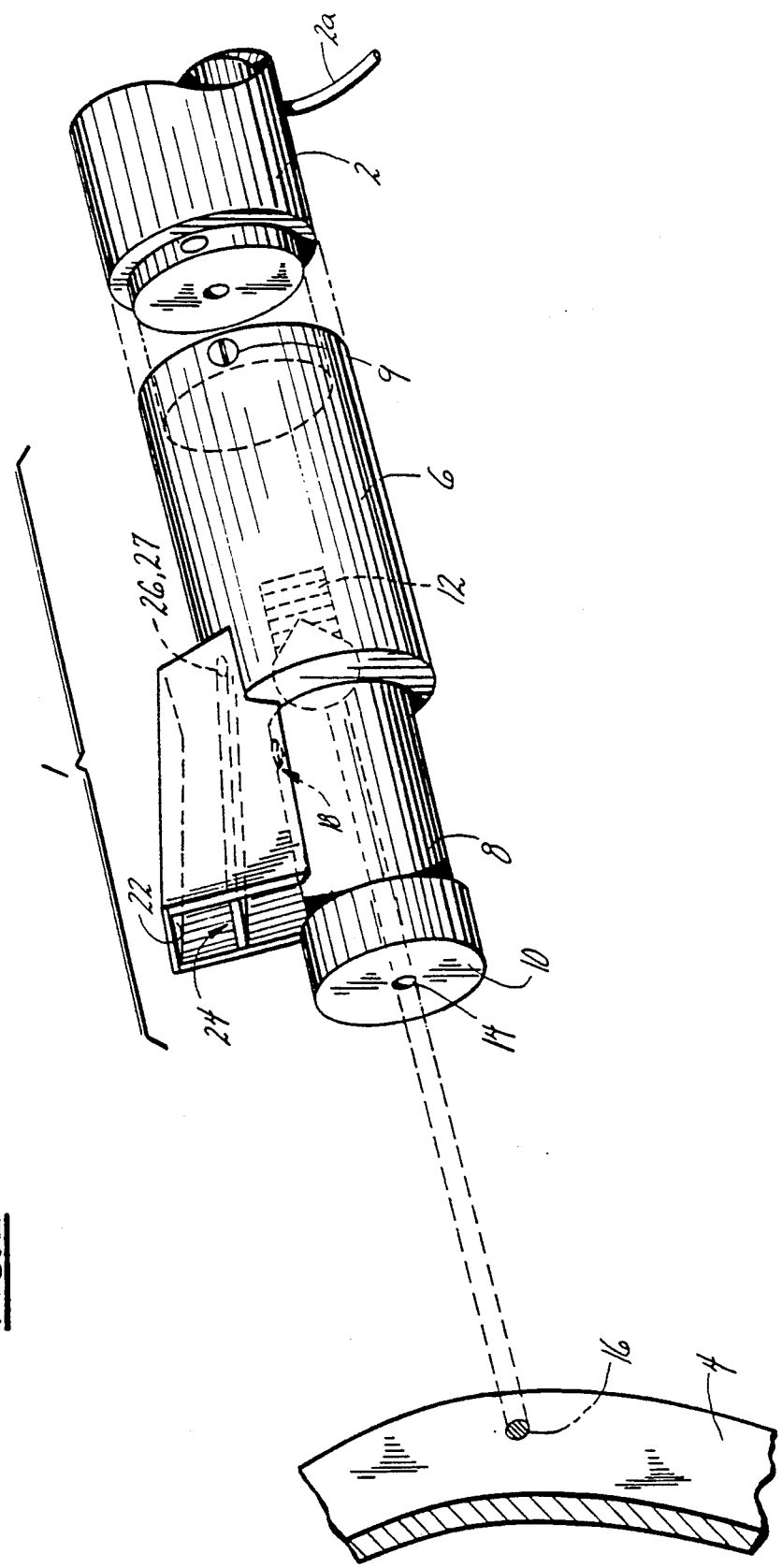
FIG. 2 is a perspective view of the sprayhead positioning system, illustrating the arrangement of the system in relation to both the spray unit and a workpiece.

FIG. 2 refers to a more detailed view of the positioning system 1, the sprayhead 2, and a spraycoating supply conduit 2a. A primary light source, such as a lightbulb 12, is disposed within an enclosure 6, and shines within the enclosure 6, through a tube 8, and then through an aperture 14 in a cap 10, resulting in the projection of the primary light pattern 16 on the workpiece 4. The aperture 14 is sized and shaped such that it will produce a primary light pattern 16 which will mimic the sprayhead's spray pattern upon the workpiece 4. A round aperture is typically selected for aircraft engine applications. The sprayhead positioning system 1 must be detached from the sprayhead 2 prior to actual spraycoating operation.

Figure 3:
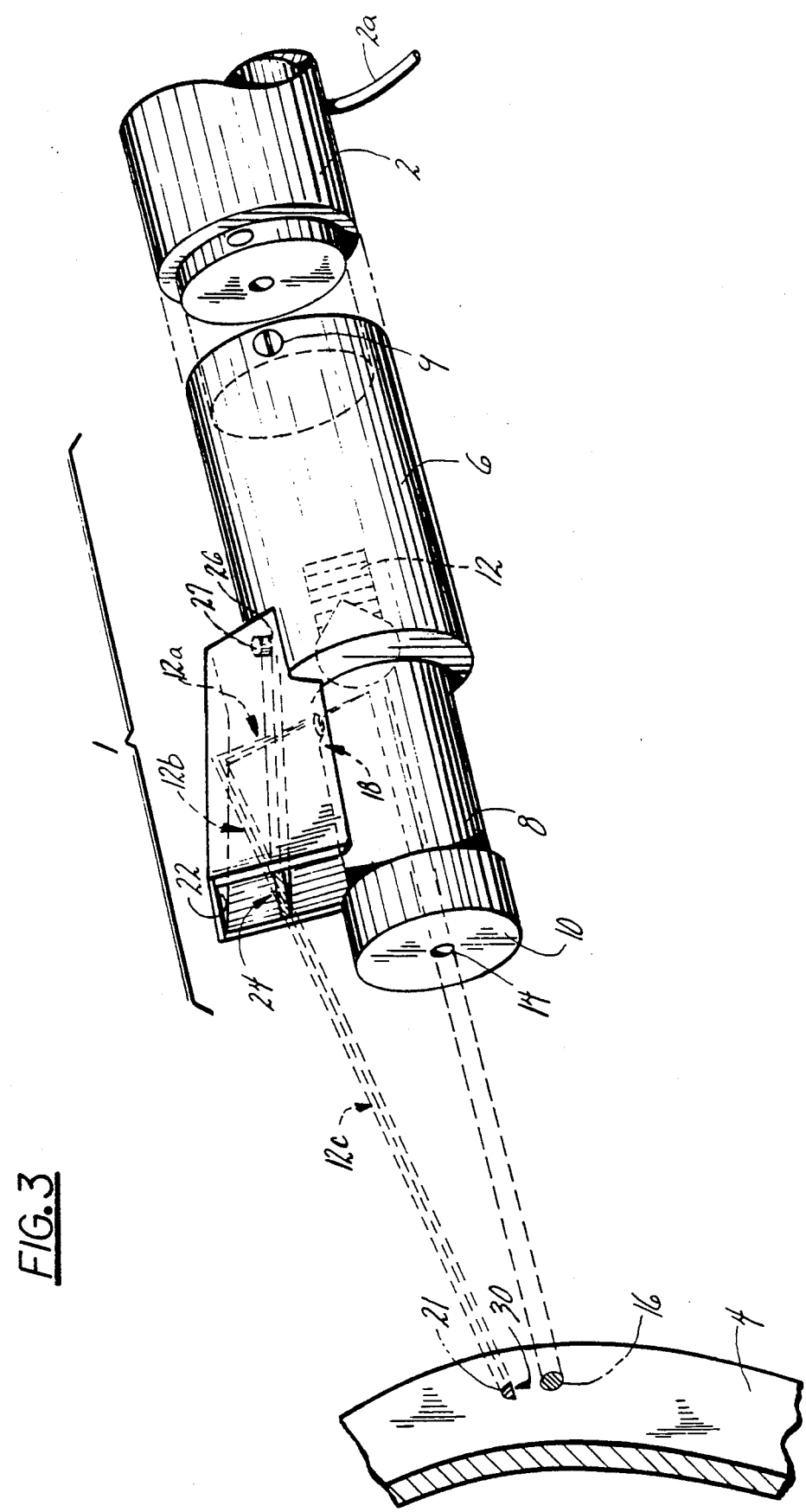
FIG. 3 is an enlarged view of the reflector-light bar assembly, showing the relation of this assembly to the overall sprayhead positioning system.

As seen in FIG. 3, an initial secondary light pattern 21 is created by a light 12a from the light source 12. This light 12a passes within the enclosure 6, then through a tube 8, and then through a secondary aperture 18 which is peripherally located in the tube 8. This light 12a then strikes a reflector 22. The reflected light 12b is then partially blocked by a light-bar 24, resulting in the casting of modified light 12c upon workpiece 4, creating secondary light pattern 21. When the sprayhead positioning system 1 is properly spaced in relation to the workpiece 4, the shadow edge 30 of the secondary light pattern 20 will be in a spaced relationship with the periphery of primary light pattern 16.

Figure 4:
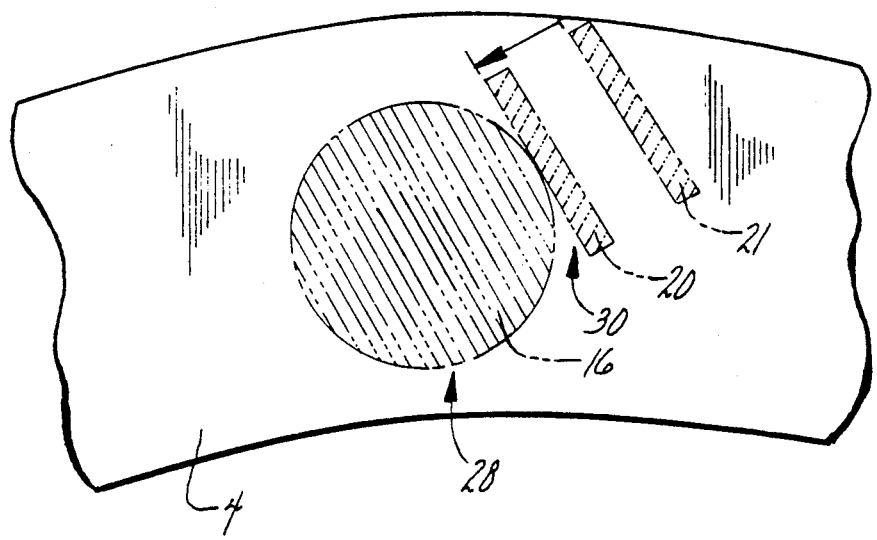
FIG. 4 is a schematic view of a primary light pattern converging with a secondary light pattern.

The desired sprayhead distance relative to the workpiece is indicated as shown in FIG. 4 upon the occurrence of direct tangential contact of the linear shadow edge 30 of the secondary light pattern 20 with the circular shadow edge 28 of primary light pattern 16.

The light-bar 24 in FIG. 3 is rotationally adjustable about a pivot 26 which is mounted on the enclosure 6 to allow variation of the proper sprayhead-to-workpiece distance. The pivot's axis of motion is perpendicular to the longitudinal orientation of enclosure 6. The pivot 26 also incorporates means for locking the light-bar 24, such as a thumbscrew 27, into a fixed position relative to enclosure 6.

As shown in FIG. 4, the casting of the primary light pattern 16 upon the workpiece 4 is created by the projection of light originating from the primary light source 12 which ultimately passes through the primary aperture 14 as shown in FIG. 2. The primary aperture 14 may be of varying sizes and shapes. Primary apertures 14 ranging in diameter from 0.125 inch through 0.330 inch (3.2-8.4 mm) have been used. Selection of the proper aperture 14 will be determined by the specific application.

Figure 5:
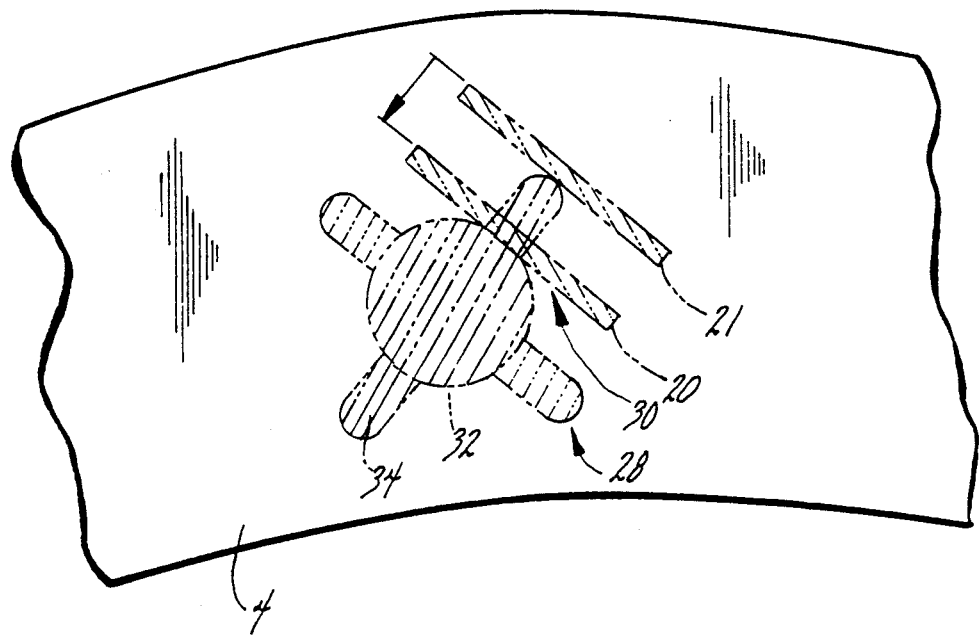
FIG. 5 is a schematic view of a modified primary light pattern converging with a secondary light pattern.

An alternate primary aperture design (not shown), which casts a pattern 32 as diagrammatically represented in FIG. 5, incorporates a round central opening with a plurality of shaped cut-outs 34 radially disposed around the opening.

Optimum positioning is easier to accomplish with this alternate primary aperture pattern 32 when the following procedure is followed: The operator chooses the optimum sprayhead distance for a given sprayable material and the related orifice. The operator then initially positions the primary light pattern's shadow edge 28 of a cut-out 34 on or near the first desired coating location, which may be at an edge, a discontinuity, or at an internal location of the workpiece 4. The operator then continues to maneuver the locating arm 3 until the shadow edge 30 of the secondary light pattern 21 completely overlays the particular cut-out 34, but without allowing the shadow edge 30 to overlap the light pattern cast by the central aperture. Achievement of this new light pattern, as shown in FIG. 5, indicates the establishment of the optimum sprayhead distance from the workpiece 4.

Furthermore, this embodiment is useful in determining the precise location of an edge of a workpiece 4. This is important when choosing beginning and ending locations in a given spraycoating program. When used in conjunction with intermediate locations on a workpiece, tapered coatings may be reproducibly achieved.

Additional aperture shapes and sizes that may aid in the positioning, alignment, and resulting spray coverages and thicknesses by a sprayhead will inevitably occur to one skilled in the art. Any such design will be deemed to be within the scope of the invention as defined by the appended claims.

The typical focusing range of the sprayhead positioning system 1 relative to the workpiece 4 is 2 inches to 5 inches (5.1-12.7 mm), with a nominal operating distance of 3.5 inches (8.9 mm), calculated from the sprayhead 2 to the workpiece 4.

The current invention is readily used for establishing reproducible spraycoating programs for a given workpiece 4. These programs, as recorded in a computer or other numerical controller, are then accessible for later use. Creation of a typical spraycoating program occurs as follows: the sprayhead positioning system 1 is affixed to the robotically-controlled locating arm 3, as previously described and shown in FIG. 1. The locating arm 3 is then moved into the proper position as indicated by the system illumination patterns described above, establishing the first position of the spraycoating program. The operator then moves the sprayhead 2 and the sprayhead positioning system 1 over the workpiece, recording additional locations and orientations. These data points are then entered into the associated database, forming a specific reproducible program for use on identical workpieces.

Visual verification of the spraycoating program can be performed quickly and precisely by the operator. This is achieved by running the new program with the system 1 in place and observing the movement of the light patterns 20, 21 over the workpiece 4. Spraycoat thickness, coverage, traverse time, and creation of tapered edges can be verified over the most complex surfaces.

It has been found that proper application of this procedure provides control of coating coverage, alignment, and spray pattern, and yields spraycoated surfaces whose edges can by reproducibly coated to within a tolerance of 0.010 inch measured from an edge. This accuracy permits achievement of precise spraycoat thicknesses of tapered edges on a given workpiece.

Further modifications and improvements of the invention herein disclosed will occur to those skilled in the respective arts and all such modifications and improvements are deemed to be within the scope of the invention as defined by the appended claims.

I claim:

1. A system for indicating a desired relative position between a sprayhead and a workpiece, wherein said system is coaxially affixed to a sprayhead, said sprayhead supported by a locating arm, comprising:
   an enclosure containing a primary light source,
   a primary light aperture disposed in the enclosure in spaced relationship between the primary light source and the workpiece, the primary light source, primary light aperture, and workpiece in coaxial alignment, the light source projecting a primary light pattern along the alignment upon the workpiece;
   a secondary light aperture disposed through the periphery of the enclosure, the secondary aperture being skewed from the axial alignment of the primary light source, the primary light aperture, and the workpiece;
   a reflector disposed outside the enclosure in coaxial spaced relationship with the primary light source and the secondary light aperture, whereby the illumination from the primary light source reaching the reflector through the secondary light aperture is reflected onto the workpiece, resulting in an initial secondary light pattern cast thereon,;
   a selectively adjustable light-bar in spaced relationship between the reflector and the workpiece whereby the light-bar interferes with the initial secondary light pattern as reflected upon the workpiece such that a shadow edge of the initial secondary light pattern created by the interference of the light bar is locatable proximate to the primary light pattern cast thereon, the proximity of the shadow edge of the secondary light pattern with the primary light pattern indicative of a desired sprayhead-to-workpiece distance.

2. A system as claimed in claim 1, that includes means for selectively attaching said system to a sprayhead.

3. A system as claimed in claim 1, wherein the primary aperture is round.

4. A system as claimed in claim 1, wherein the primary aperture includes a central opening with a plurality of radially disposed shaped cut-outs.

5. A system as claimed in claim 1, wherein the secondary aperture is disposed in the enclosure between the primary light source and the reflector.

6. A system as claimed in claim 1, wherein the light-bar is rotationally adjustable about the enclosure.

7. A system as claimed in claim 1, wherein the light-bar is rotationally adjustable about a pivot affixed to the enclosure, said pivot's axis of rotation perpendicular to the direction defined by the lightpath from the primary light source passing through the primary light aperture.

8. A system as claimed in claim 7, further including means for selectably locking the light-bar pivot against movement.

9. A method of determining the optimum position of a sprayhead for the desired spraycoating of a workpiece, comprising the following steps:
   (a) providing a primary light pattern on a workpiece;
   (b) providing a secondary light pattern on the workpiece by casting the secondary light pattern on the workpiece from a direction that is not coaxial with the direction of the primary light pattern, wherein the secondary light pattern reaches and reflects off a reflector not coaxially aligned with the projected primary light pattern, whereby the secondary light pattern as reflected off the reflector and directed toward the workpiece is modified by a light-bar located in spaced relationship between the reflector and the workpiece such that the interference of the light-bar with the secondary light pattern creates a shadow edge of the secondary light pattern, and whereby the secondary light pattern's light-bar generated shadow edge is locatable proximate to the primary light pattern cast on the workpiece;
   (c) maneuvering the sprayhead while observing the primary light pattern and the secondary light pattern's light-bar generated shadow edge cast proximate thereto on the workpiece;
   (d) causing convergence of the primary light pattern and secondary light pattern's light-bar-generated shadow edge on the workpiece whereby the proximity of the shadow edge of the secondary light pattern to the cast primary light pattern indicates a desired sprayhead-to-workpiece distance;
   (e) recording the resulting position of the sprayhead.

10. A method of creating a numerically-controlled, reproducible spraycoating program, by establishing the optimum position of a sprayhead in relation to a workpiece as claimed in claim 9, further comprising repetition of steps (a) through (e) for a plurality of other positions relative to the workpiece.

* * * * *